United States Patent Office 3,394,187
Patented July 23, 1968

3,394,187
INTERCONVERSION OF AMINES
Kenneth H. Markiewitz, Wilmington, Del., assignor to Atlas Chemical Industries, Inc., Wilmington, Del., a corporation of Delaware
No Drawing. Filed June 18, 1965, Ser. No. 465,188
8 Claims. (Cl. 260—583)

ABSTRACT OF THE DISCLOSURE

The formation of tertiary amines during the interconversion of primary and secondary amines in the presence of a hydrogenation catalyst can be suppressed by carrying out the interconversion in the presence of at least about 5% by weight of water based on the weight of amine. The interconversion may be carried out at a temperature of about 150° C. to about 275° C.

This invention relates to the interconversion of amines, and more particularly to an improved process for the interconversion of primary and secondary amines.

The expression "interconversion of primary and secondary amines," as used throughout the specification and appended claims, denotes the conversion of primary amines to secondary amines and the conversion of secondary amines to primary amines.

It is known that the interconversion of primary and secondary amines may be accomplished by heating the amine in the presence of a hydrogenation catalyst, such as Raney nickel or other Raney metal; or supported noble metal, for example, palladium on charcoal. The interconversion is usually carried out in an autoclave which, if desired, may be pressurized with a gas such as hydrogen or nitrogen. Ammonia may also be present. The interconversion reaction between primary and secondary amines is, in general, accompanied by a side reaction in which tertiary amines are formed. The presence of tertiary amines complicates the process of recovery of the sought primary or secondary amine, particularly in the case of high molecular weight amines. It would, therefore, be highly desirable to suppress the formation of tertiary amine, that is to increase the ratio of primary amine to tertiary amine in the conversion of secondary amine to primary amine and to increase the ratio of secondary amine to tertiary amine in the conversion of primary amine to secondary amine.

In accordance with the present invention, it has been discovered that the formation of tertiary amines during the interconversion of primary and secondary amines can be suppressed by carrying out the interconversion in the presence of water. It was completely unexpected that the presence of water would suppress the formation of tertiary amines since water does not enter into the reaction. Although the choice of hydrogenation catalyst or reaction conditions employed can vary widely, the proportion of tertiary amine in the product can be substantially reduced merely by carrying out the conversion reaction in the presence of added water. This is particularly valuable in the interconversion of high molecular weight amines where their high boiling points, such as those having a boiling point of at least 300° C., make their separation extremely difficult or impossible and hence preclude their recycling.

The primary amine can be any primary amine, other than methyl amine and phenyl or substituted phenyl monooxyalkylene amines, that is free of ethylenic and acetylenic unsaturation and that is free of substituents that are reactive with amino nitrogen atoms such as halogen and terminal hydroxyl groups. Among the primary amines which can be converted to secondary amines are those having the formula $R'NH_2$ where $R'$ is an organic radical selected from the group consisting of alkyl radicals having at least two carbon atoms such as ethyl, propyl, butyl, pentyl, hexyl, heptyl, octyl, nonyl, decyl, octadecyl, eicosyl, etc. and isomers thereof; oxa-alkyl radicals such as butoxy-nonapropyleneoxy-propyl, propoxy-nonaethyleneoxybutyl, stearyloxy-tetraethyleneoxy-ethyl, stearyloxy - tetrapropyleneoxy - butyl, etc.; cycloalkyl radicals such as cyclopropyl, cyclobutyl, cyclopentyl, cyclohexyl, cycloheptyl, cyclooctyl, methylcyclobutyl, ethylcyclopentyl, tert-butyl-methylcyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, napthylpropyl, etc.; and

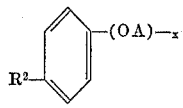

where A is an alkylene radical of from 2–4 carbons, $x$ is at least 2, and $R^2$ is selected from the group consisting of alkyl, oxa-alkyl, cycloalkyl, cycloalkylalkyl, aryl, and aralkyl, such as methylphenyl-trioxypropylene, butylphenyl-tetraoxyethylene-tetraoxypropylene, methylphenylnonaoxypropylene, etc.; with the proviso that $R'$ is free of ethylenic and acetylenic unsaturation and with the further proviso that $R'$ is free of substituents that are reactive with amino nitrogen. Typical primary amines are ethylamine, propylamine, butylamine, pentylamine, hexylamine, heptylamine, octylamine, nonylamine, decylamine, undecylamine, dodecylamine, hexadecylamine, eicosylamine, N-(butoxy-nonapropyleneoxy-propyl) amine, N-(propoxy-nonaethyleneoxy-butyl) amine, N-(stearyloxy-tetraethyleneoxy-ethyl) amine, N-(stearyloxy-tetrapropyl-eneoxy-butyl) amine, cyclobutylamine, cyclohexylamine, cyclooctylamine, ethylcyclopentylamine, isopropylcyclohexylamine, cyclopentylethylamine, cyclohexylpropylamine, phenylamine, biphenylamine, napthylamine, ethylphenylamine, butylnaphthyl amine, benzylamine, phenylethylamine, naphthylpropylamine, ethylphenyl-nonaoxyethylene amine, methylphenyl-tetraoxypropylene amine, butylphenyltetraoxyethylene - tetraoxypropylene amine, methylphenylnonaoxyethylene amine, butylphenyl-tetraoxypropylene-tetraoxyethylene amine, and the like.

The secondary amine can be any secondary amine, other than dimethylamine and di(phenyl or substituted phenyl monooxyalkylene) amine that is free of ethylenic and acetylenic unsaturation and that is free of substituents that are reactive with amino nitrogen atoms such as halogen and terminal hydroxyl groups. Among the secondary amines which can be converted to primary amines are those having the formula $R'NHR''$, where $R'$ and $R''$ may be alike or different and are selected from the group consisting of alkyl radicals having at least two carbon atoms, such as ethyl, propyl, butyl, pentyl, hexyl, heptyl, octyl, nonyl, decyl, octadecyl, eicosyl, etc. and isomers thereof; oxa-alkyl radicals such as oxyethyl, oxypropyl, ethoxyethyl, butoxy-nonapropyleneoxy, propoxy-nonaethyleneoxy-butyl, stearyloxy-tetraethyleneoxy-ethyl, etc.; cycloalkyl radicals such as cyclopropyl, cyclobutyl, cyclopentyl, cyclohexyl, cycloheptyl, cyclooctyl, methylcyclobutyl, ethycyclopentyl, tert-butyl-methycyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc.; and

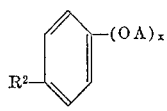

where A is an alkylene radical of from 2–4 carbons, $x$ is at least 2, and $R^2$ is selected from the group consisting of alkyl, oxy-alkyl, cycloalkyl, cycloalkyl-alkyl, aryl and aralkyl; with the proviso that R' and R" are free of ethylenic and acetylenic unsaturation and with the further proviso that R' and R" are free of substituents that are reactive with amino nitrogen. Typical secondary amines are diethyl amine dipropyl amine, dibutyl amine, dipentyl amine, dihexyl amine, diheptyl amine, dioctyl amine, dinonyl amine, didecyl amine, diundecyl amine, didodecyl amine, dihexadecyl amine, dieicosyl amine, di(stearyloxy-tetraethyleneoxy-ethyl) amine, di(stearyloxy-tetrapropyleneoxy - propyl) amine, di(butoxy-nonapropyleneoxy-propyl) amine, di(propoxy - nonaethyleneoxy - butyl) amine, di(cyclobutyl) amine, di(cyclohexyl) amine, di(cyclooctyl) amine, di(ethylcyclopentyl) amine, di(isopropylcyclohexyl) amine, di(cyclopentylethyl) amine, di(cyclohexylpropyl) amine, di(phenyl) amine, di(biphenyl) amine, di(napthyl) amine, di(ethylphenyl) amine, di(butylnaphthyl) amine, di(benzyl) amine, di(phenylethyl) amine, di(naphthylpropyl) amine, di(ethylphenyl) amine, di(nonaoxyethylene) amine, di(methylphenyl-tetraoxypropylene) amine, di(butylphenyl-tetraoxyethylene-tetraoxypropylene) amine, di(methylphenyl-nonaoxyethylene) amine, di(butylphenyl-tetraoxypropylene-tetraoxyethylene) amine, and the like.

The amount of water added depends on the particular amine being converted. Generally, the amount of water added should be at least about 5% and preferably at least about 10% by weight based on the weight of the amine. Although less than 5% of water can be added, the maximum suppression of tertiary amine is not obtained until at least 5% of water is added. There is no upper limit as to the amount of water than can be added, but no advantage is gained by adding over about 20% by weight of amine.

The interconversion is carried out at a temperature in the range of about 150° C. to about 275° C. The interconversion is not sufficiently rapid at lower temperatures and the formation of substantial amounts of non-amino nitrogen compounds occurs at higher temperatures. Generally, temperatures between about 175° C. to about 250° C. are employed. The conversion can take place in the liquid phase or in the vapor phase.

The following examples will illustrate the present invention and the manner in which it may be practiced, but it is to be understood that such details are given for exemplification purposes and are not to be construed as limiting the scope of the appended claims. Numbered examples are in accordance with the invention, those designated by letter are inserted for purposes of comparison.

Example A

A two liter stainless steel stirred autoclave was charged with 600 ml. n-butylamine, and 20 ml. Raney nickel slurry. The autoclave was pressurized with 500 p.s.i. nitrogen. The reaction mixture was heated for 3 hours at 250° C. The maximum pressure developed during the reaction was 1300 p.s.i. The reaction mixture was thereupon cooled, siphoned out of the autoclave, the catalyst removed by filtration, and the filtrate examined by gas liquid partition chromatography. Analysis of the reaction products shows a mixture of amines consisting of 15.1% n-butylamine, 68.5% di-n-butylamine, and 16.5% tri-n-butylamine.

Example 1

Example A was repeated under identical conditions except that 60 ml. of water was added to the reaction mixture. The maximum pressure developed during the reaction was 1400 p.s.i. Analysis of the reaction products showed a mixture of amines consisting only of 33.7% n-butylamine and 66.3% di-n-butylamine. No tri-n-butylamine was detected. Thus, the presence of water caused a reduction in the amount of triamine formed from 16.5% to zero.

Example B

A 1 gallon stainless steel stirred autoclave was charged with 600 ml. n-butylamine and 20 ml. Raney nickel slurry. The autoclave was pressurized to 1500 p.s.i. with hydrogen. The reaction mixture was heated at 250° C. for 2 hours. The maximum pressure developed during the reaction was 2550 p.s.i. Analysis of the reaction products showed a mixture of amines consisting of 13.3% n-butylamine, 61.7% di-n-butylamine, and 25.0% tri-n-butylamine.

Example 2

Example B was repeated under identical conditions except that 60 ml. of water was added to the reaction mixture. The maximum pressure developed during the reaction was 2600 p.s.i. Analysis of the reaction products showed a mixture of amines consisting of 17.3% n-butylamine, 71.8% di-n-butylamine, and 10.9% tri-n-butylamine. Thus, the presence of water caused an increase in the ratio of diamine to triamine from 2.5 to 6.5.

It is readily apparent from a comparison of Examples 1 and 2 with Examples A and B that the presence of water substantially decreases the amount of tertiary amine formed when primary amines are converted to secondary amines over hydrogenation catalyst.

Example 3

A 2 liter stainless steel stirred autoclave was charged with 600 ml. n-butylamine, 20 ml. Raney nickel slurry, 66 ml. of water, and 150 grams anhydrous ammonia. The reaction mixture was heated at 250° C. for 3 hours. The maximum pressure developed during the reaction was 2400 p.s.i. Analysis of the reaction products showed a mixture of amines consisting only of 71.2% n-butylamine and 28.8% di-n-butylamine. No tri-n-butylamine was detected. Little or no n-butanol was formed during the reaction.

Example 4

Di(stearyloxy tetraethyleneoxy ethyl) amine can be prepared from N-(stearyloxy tetraethyleneoxy ethyl) amine by charging a two liter stainless steel stirred autoclave with 600 ml. of N-(stearyloxy tetraethyleneoxy ethyl) amine, 20 ml. Raney nickel slurry, and 60 ml. of water and heating the resulting mixture at 200° C. for 2 hours.

Example 5

Di(pentadecyl) amine can be prepared from pentadecylamine (B.P. 301° C.) by charging a two liter stainless steel autoclave with 500 ml. of pentadecylamine, 60 ml. of water, and 25 ml. of a Raney nickel slurry and heating the resulting mixture at 225° C. for 2 hours.

Example 6

Di(methylphenyl tetraoxypropylene) amine can be prepared from N-(methylphenyl tetraoxypropylene) amine by charging an autoclave with 600 ml. of N-(methylphenyl tetraoxypropylene) amine, 20 ml. of a Raney nickel slurry, and 100 ml. of water and heating the resulting mixture to 175° C. for 3 hours.

The following examples show the same effect of water during the rearrangement of secondary amines to primary amines, that is to decrease the amount of tertiary amine formed.

Example C

A 2 liter stainless steel stirred autoclave was charged with 600 ml. of di-n-butylamine and 20 ml. of Raney nickel slurry. The autoclave was pressurized to 500 p.s.i. with nitrogen. The reaction mixture was heated at 250° C. for 3 hours. The maximum pressure developed during the reaction was 1025 p.s.i. Analysis of the reaction products showed a mixture of amines consisting of 12.0% n-butylamine, 40.3% di-n-butylamine, and 47.7% tri-n-butylamine.

Example 7

Example C was repeated under identical conditions except that 60 ml. of water was added to the reaction mixture. The maximum pressure developed during the reaction was 1125 p.s.i. Analysis of the reaction products showed a mixture of amines consisting of 13.7% n-butylamine, 74.6% di-n-butylamine, and 11.6% tri-n-butylamine. The presence of water caused an increase in the ratio of monoamine to triamine from 0.25 to 1.2.

Example D

A 2 liter stainless steel, stirred autoclave was charged with 520 ml. of di-n-butylamine, 20 ml. of a Raney nickel slurry, and 70 grams anhydrous ammonia. The reaction mixture was heated at 250° C. for three hours. The maximum pressure developed during the reaction was 700 p.s.i. Analysis of the reaction products showed a mixture of amines consisting of 15.3% n-butylamine, 67.2% di-n-butylamine, and 17.5% tri-n-butylamine.

Example 8

Example D was repeated under identical conditions except that 66 ml. of water was added to the reaction mixture. The maximum pressure developed during the reaction was 1275 p.s.i. Analysis of the reaction products showed a mixture of amines consisting only of 10.9% n-butylamine and 89.1% di-n-butylamine. No tri-n-butylamine was detected. Thus, the presence of water caused a reduction in the amount of tri-n-butylamine formed from 17.5% to zero.

Example 9

N-(propoxy nonaethyleneoxy butyl) amine can be prepared from di(propoxy nonaethyleneoxy butyl) amine by charging an autoclave with 520 ml. of di(propoxy nonaethyleneoxy butyl) amine, 20 ml. of a Raney nickel slurry, and 80 ml. of water and heating the resulting mixture to 190° C. for 3 hours.

Example 10

Aniline can be prepared from diphenylamine by charging an autoclave with 600 ml. of diphenylamine, 20 ml. of a Raney nickel slurry, and 60 ml. of water and heating the resulting mixture at 225° C. for 2 hours.

Example 11

Cyclohexylamine can be prepared from di(cyclohexyl) amine by charging a two liter stainless steel autoclave with 500 ml. of di(cyclohexyl) amine, 60 ml. of water, and 25 ml. of a Raney nickel slurry and heating the resulting mixture to 240° C. for 1 hour.

It is apparent from the foregoing examples that the reaction conditions can be varied widely, but that other reaction conditions being equal, the presence of water suppresses the formation of tertiary amines. It is understood, of course, that the foregoing examples are merely illustrative and that any of the primary and secondary amines described above can be used in place of the amines shown in the illustrative examples.

Having described the invention, what is desired to be secured by Letters Patent is:

I claim:

1. The process of interconverting primary and secondary amines with suppression of tertiary amine formation which comprises subjecting an amine selected from the group consisting of primary amines having the structural formula $R'NH_2$ and secondary amines having the structural formula $R'NHR''$, where $R'$ and $R''$ are organic radicals selected from the group consisting of alkyl radicals having at least two carbon atoms, oxaalkyl radicals, cycloalkyl radicals, cycloalkyl-alkyl radicals, aryl radicals, aralkyl radicals, and

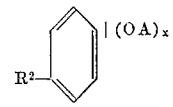

radicals where A is an alkylene radical of from 2–4 carbons, $x$ is at least 2, and $R^2$ is selected from the group consisting of alkyl, oxa-alkyl, cycloalkyl, cycloalkyl-alkyl, aryl, and aralkyl, to a temperature of about 150° C. to about 275° C., in the presence of a hydrogenation catalyst, and in the presence of at least 5% by weight of water based on the weight of amine.

2. The process of interconverting primary and secondary amines with suppression of tertiary amine formation which comprises subjecting an amine selected from the group consisting of primary amines having the formula $R'NH_2$ and secondary amines having the structural formula $R'NHR''$, where $R'$ and $R''$ are organic radicals selected from the group consisting of alkyl radicals having at least two carbon atoms, oxa-alkyl radicals, cycloalkyl radicals, and cycloalkyl-alkyl radicals, to a temperature of about 150° C. to about 275° C., in the presence of a hydrogenation catalyst, and in the presence of at least 5% by weight of water based on the weight of amine.

3. The process of converting secondary amines to primary amines with suppression of tertiary amine formation which comprises subjecting an amine having the formula $R'NHR''$, where $R'$ and $R''$ are organic radicals selected from the group consisting of alkyl radicals having at least two carbon atoms, oxa-alkyl radicals, cycloalkyl radicals, cycloalkyl-alkyl radicals, aryl radicals, aralkyl radicals, and

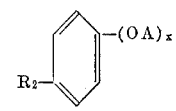

radicals where A is an alkylene radical of from 2–4 carbons, $x$ is at least 2, and $R^2$ is selected from the group consisting of alkyl, oxa-alkyl, cycloalkyl, cycloalkyl-alkyl, aryl, and aralkyl to a temperature of about 150° C. to about 275° C., in the presence of a hydrogenation catalyst, and in the presence of at least 5% by weight of water based on the weight of amine.

4. The process of claim 1 wherein the hydrogenation catalyst is a Raney nickel catalyst.

5. The process of claim 4 wherein the temperature is about 175° C. to about 250° C.

6. The process of claim 1 wherein the primary and secondary amines have a boiling point of at least 300° C.

7. The process of claim 4 wherein the amine is butyl amine.

8. The process of claim 4 wherein the amine is dibutylamine.

References Cited

UNITED STATES PATENTS 1,422,494    7/1922    Tanberg _____ 260—576

OTHER REFERENCES

Hoerr et al., Journal of Organic Chemistry, vol. 9, p. 201 (1944).

CHARLES B. PARKER, *Primary Examiner.*

R. RAYMOND, *Assistant Examiner.*

UNITED STATES PATENT OFFICE
CERTIFICATE OF CORRECTION

Patent No. 3,394,187                                July 23, 1968

Kenneth H. Markiewitz

It is certified that error appears in the above identified patent and that said Letters Patent are hereby corrected as shown below:

Column 2, lines 19 to 23, column 3, lines 3 to 8, and column 5, lines 9 to 14 and lines 42 to 47, the formula, each occurrence, should appear as shown below:

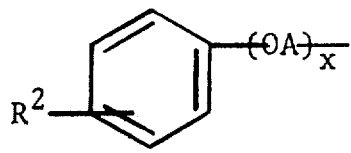

Column 6, lines 61 and 63, claim reference numerals (4), each occurrence, should read -- 5 --.

Signed and sealed this 24th day of February 1970.

(SEAL)
Attest:

EDWARD M. FLETCHER, JR.                       WILLIAM E. SCHUYLER, JR.
Attesting Officer                                 Commissioner of Patents